2,985,471
SEALING METHOD AND IMPROVED SEAL

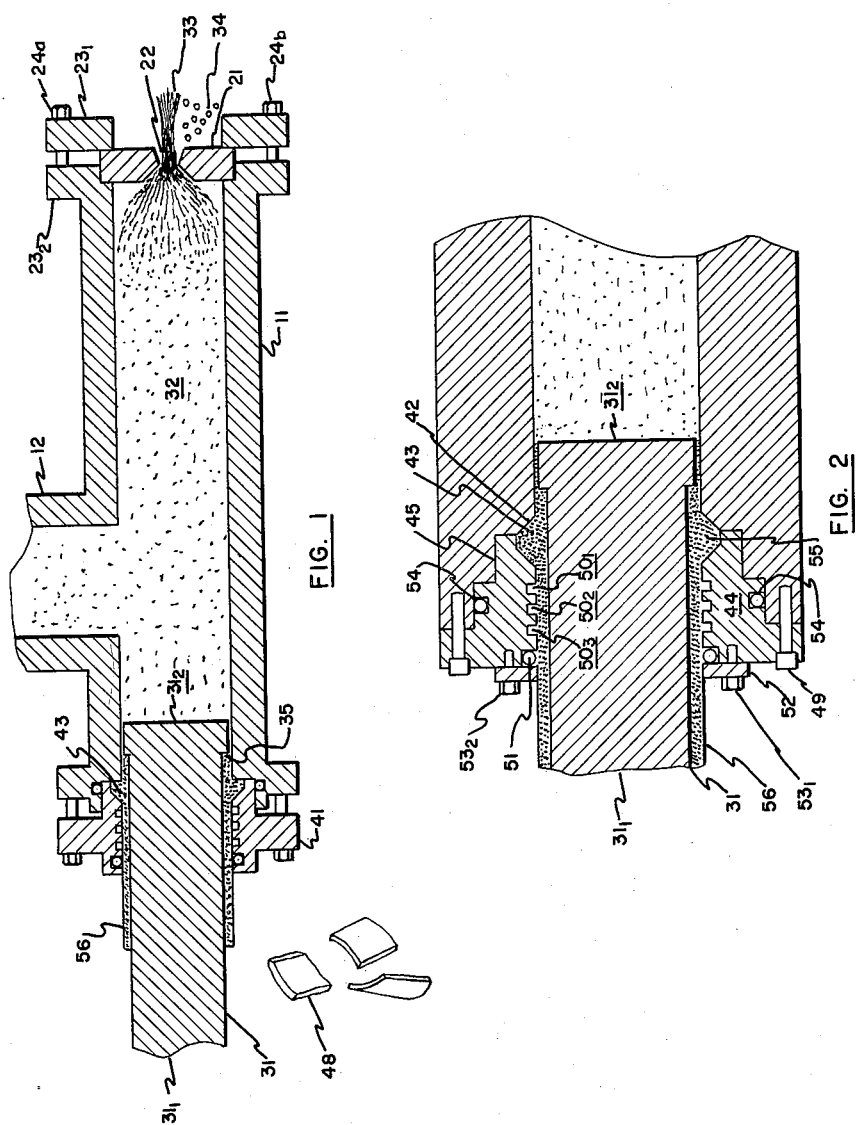

Henry A. Thomas, Baton Rouge, La., assignor to Ethyl Corporation, New York, N.Y., a corporation of Delaware Filed May 29, 1959, Ser. No. 816,970

1 Claim. (Cl. 286—1)

This invention relates to the treatment of high solids sludges. More particularly, the invention relates to the treating of such sludges by a pressing-extrusion operation by reciprocating means and to establishing seal devices and means in such operations.

Frequently, in industrial processes, by-product or product streams comprising high solid sludges are found wherein the solids are relatively finely sub-divided, malleable metals. The problem of resolving or separating the components of such streams has frequently involved the thermal drying of the system, to isolate a dry metallic powder, which is then smelted for recovery operations. Unfortunately, thermal drying operations are relatively expensive, and in addition the preparation of the sub-divided metal for smelting in this fashion does not lend itself to highly efficient smelting operations. High surfaces created by finely sub-divided solids result in a high susceptibility to oxidation or other degradation treatment. In addition, certain losses occur because of the fine state of physical sub-division. This situation is encountered, for example, in the manufacture of organo-lead compounds, such as tetraethyl lead.

It has been discovered that the components of such systems can be greatly resolved, or separated, to a high extent by an operation involving application of high pressures on the raw sludge in a closed chamber, having an orifice or extrusion aperture in an end boundary of the processing zone. It has been found that the application of sufficient pressure results in the separation of the liquid phases as discreet phases, and the conversion of the solids into substantially homogeneous, rigorous shapes. These metal shapes are particularly susceptible to further metallurgical treatment and smelting.

The foregoing operations can be conducted in reciprocating, or ram type devices, wherein a cylindrical ram is reciprocated in a processing chamber, the chamber having at one terminus the extrusion or discharge orifice or aperture. Adjacent a remote portion of the chamber is a feed port, so that retraction of the ram permits entry of additional sludge to said feed port. In the design of such machines, suitable clearance must be provided between the walls of the chamber and the ram for effective movement therein. Due to the highly malleable nature of the metals being processed, it is found that a "skin" or shim of mechanically worked metal is frequently formed on the walls of the chamber. One difficulty in machines of this character has been that sealing means must be provided at the point where the ram travels through the wall of the processing chamber, to prevent the discharge through the exterior of the vessel liquid phase which is released during the pressing-extrusion operation. Attempts to employ tightly fitting, commercially available seals, have been largely unsuccessful, because it is found that the retraction of the ram tends to retract the shim or thin skins mentioned above, and this thin layer of processed metal tends to cut, gouge or otherwise deform the commercial type seals. Accordingly, gaps in the seals rapidly occur and the operation of the process was necessarily discontinued. Therefore, a significant need existed for an effective mode of sealing such reciprocating processing apparatus from liquid leakage.

An object of the present invention is to provide a new technique for sealing reciprocating ram type metal extruding machines when applied to the processing of high solids-liquid sludges of metals of a highly malleable character. A further specific object is to provide as a new structure a highly effective seal device. A more general object is to improve a process for the separation of high solid sludges into compacted, homogeneous metal shapes and liquid phases for recovery operations. Other objects will appear hereinafter.

The details of the invention, and of the mode of operations and of the new structure provided herein will be clear from the description hereinafter and the figures, wherein:

Fig. 1 is a schematic, generalized representation of apparatus of the type to which the present invention is applicable and Fig. 2 is an enlarged illustration showing the seal provided by the present invention in somewhat larger detail.

In its most general form, the method of the present invention, comprises, in the operation of a ram type metals processing machine of the character described above, the formation of laminar and peripheral segments of the malleable metal being processed, between the ram and the wall of the processing chamber during the working stroke or operation. Upon a retraction stroke of the ram or reciprocable element of the apparatus, said laminae are retracted toward the "back end" of the processing chamber. Further, the laminae is temporarily collected in a peripheral form providing a seal for the ram in its passage to and fro in the processing chamber, and further, the said metal is then forced to the exterior in a thin wall shape. In other words, the process involves deliberately retracting a portion of the metal being processed in a continuous manner such that a liquid tight seal is provided for the reciprocable element. Thus, the present invention includes as an embodiment a seal member formed of the metal being processed. The seal member of the present invention is a ring like shape of the malleable metal being processed, including a thick wall section, a frusto-conic section, and a thin wall section, the thin wall section being joined to the thick wall section by the said frusto-conic section. A particular feature of the method is the contraction of the said laminae, upon formation as a seal, in an inward direction on the reciprocating ram shaft, due to the moving influence of the ram shaft itself.

Referring to Fig. 1, this illustrates schematically the general disposition of the significant portions of the apparatus employed in utilizing the present method and in establishing the new seal of the present invention. The major components of the total apparatus include a processing chamber or barrel 11, a die plate 21, a ram 31 fitting within the barrel 11, and a seal assembly 41. The barrel 11 is of cylindrical configuration, and has branching at one portion thereof, relatively near an end remote from the die plate 21, a feed conduit or aperture 12. The die plate 21 has a circular aperture 22 therein, and the die plate is secured in place by appropriate fastening means such as a collar or a flange $23_1$, fastened by bolts $24_a$, $24_b$ to a flange $23_2$ on the end of the barrel 11.

The ram 31 is a cylindrical bar of metal of sufficient strength to withstand the substantially high forces involved, having a smaller diameter portion $31_1$ and face plate portion $31_2$. The relative dimensions of these two portions of a ram are exaggerated for clarity in Fig. 1, typical proportions being only a difference of, for example, about 1/16 or 1/32 of an inch in diameter of the two portions. In addition to the clearance between the wall of the chamber 11 provided by said difference, the ram face portion $31_2$ also has minor clearance between the wall of the chamber 11 and the boundary of the ram face $31_2$. This clearance amounts to from 0.002 to about 0.005 inch, and is essential for smooth operation, but, as already described, results in the formation of the shim type configuration of metal. During operation the ram 31 moves toward the die plate 21 forcing a sludge charge 32 toward the die. As this material approaches the die, the cross sectional area is greatly restricted and high localized forces are generated, in fact these forces amount to a mechanical working together of the individual particles in such a fashion as to produce a substantially homogeneous or solid shape 33 which is discharged from the apparatus through the aperture 22. Small amounts of liquid accompany the solid shape 33 discharged, either adhering as a film to the surface thereof or as discreet droplets 34. This "working" stroke results in the formation of the heretofore mentioned shim surfaces. Upon retraction of the ram 31, in the direction of the seal assembly 41, the reverse shoulder 35 of the ram face portion $31_2$ scrapes the lead shape back toward the seal assembly. The reason for this withdrawing action is, surprisingly, because even though malleable metals such as lead are considered to have substantially no elasticity, sufficient elasticity is exhibited so that the lead tends to spring toward the reduced diameter portion $31_1$ of the ram 31, and hence to be snagged or caught by the ram shoulder 35. This retracted portion of lead is thus forced with considerable vigor toward the seal assembly 41.

Immediately upon leaving the end of the barrel 11, the said laminae enter into an annular space 43 formed by the seal assembly 41. The space, it will be seen, includes a frusto-conic section converging in a direction externally of the barrel 11. Under the influence of the retracting action of the ram above described, the laminae tend to fully occupy said space, and because of the lateral thrust, in retracting strokes, the said frusto-conic section causes a strong gripping action of the metal upon the shaft 31. This assures a tight seal against liquid components within the process chamber.

Under the influence of continued reciprocation, an additional retraction of further laminar shapes with every retracting stroke of the ram 31, a continuous flow of minor amounts of metal to the space 43 is provided. Accompanying this flow is a further laminar flow through the body of the seal member assembly 41, the metal thus disposed of appearing externally of the apparatus as very thin wall cylindrical shape 56, which can be dislodged as arc-like thin shapes 48. These are readily recovered as such.

The precise relationships of the several parts of the seal portion, and the mode of action will be more clearly understood from reference to Fig. 2, this being an enlarged view in partial section of a slightly different embodiment of the apparatus of the invention.

Referring to Fig. 2, an end of the wall of the barrel 11 is shown, with the enlarged face portion $31_2$ of the ram 31 adjacent thereto. In other words the ram 31 is in its final retracted position in the barrel 11, which terminates in a short outwardly converging frusto-conic section 42.

The seal assembly comprises a ring like member 44 adapted to engage the barrel 11 by fitting in a recess 45 machined in the end thereof. As previously described, a frusto-conic section is machined in the main ring member 44, thus forming the annular shape or zone 43. The ring member 44 is securely attached to the body of the barrel 11 by a series of cap screws 49. A portion of the ring-like member closely approaches the reduced diameter $31_1$, of the ram 31, and contains a plurality, usually 3, of packing recesses $50_1$, $50_2$, $50_3$, in which are provided conventional packing. In addition, in a recessed shoulder 51 in the outer extremity of the ring member 44 is an O-ring seal member. This ring is retained in place by a small ring plate 52, fastened to the main ring member 44 by cap screws $53_1$, $53_2$. In an additional recess 54, in the side of the shoulder of the ring member 44 adjacent the recess in the end of the barrel 11, is an additional O-ring seal member.

As heretofore described, the retracted laminae of malleable metal are forced into and occupy the annular space 43, and form a homogeneous, dense shape or seal 55 fully encircling and gripping reduced diameter segment $31_1$ of the ram 31. This shape extends through the full seal assembly to the exterior of the apparatus as a thin cylindrical encircling portion 56. In operation, then it is seen that at any particular time the seal generated according to the present process includes the shape 55 in conjunction with the cylindrical portion 56 and, further that, under the influence of the additional laminae forced into the annular shape or zone 43, that further movement is provided, the metal leaving as the shape 56.

As a working example of the invention, in a lead extrusion apparatus having a ram of about four inches in diameter, a clearance of about 0.01 to 0.02 inch of the ram face portion measured on the diameter $31_2$, is provided, and a clearance of about 0.03 to 0.05 inch on the reduced diameter portion $31_1$. The zone 43 for receipt of the retracted shim-like lead portions, and for build up of a self seal configuration, has a thickness, in cross section, of about one-half inch, a base dimension of about 1½ inches and a crown dimension of about one-half inch. Substantially, perfect sealing is achieved. The seal produced by the operation is a ring-like member having a cross sectional configuration as indicated, the thick portion joining, by a frusto-conic section, a thin wall section extending to the exterior. As further laminae of lead metal are forced back into the seal assembly, by retracting action of the ram, compensating amounts of metal were forced out of the apparatus as the above mentioned thin wall section.

The principles of the above described invention are susceptible to considerable ramifications. Thus, the degree of convergence of the seal shape can vary from an angle of about 30 to about 60° to the lateral direction of the ram element. Further the relative thickness of the shape developed by the process is not highly critical. Generally, it is found that the shape should exhibit a thickness, in the thick wall portion, of at least about ⅛ inch and usually from about ¼ to about ½ inch. For larger installations or smaller installations, these dimensions can be correspondingly adjusted. It is not essential that the terminal portion of the bore of the processing unit barrel be a flaring or outwardly diverging portion, but this is desirable. With respect to the lateral dimension of the seal shape adjacent the shaft of the reciprocable element, proportions of, usually, from ½ to about 1.5 inches are customarily desirable. In all forms of the invention, the seal shape includes, as previously described, a continuing segment extending to the exterior of the process or apparatus, said shape being in the form of a thin wall cylindrical segment. The thickness of this portion coincides with the clearance between the ring member of the seal assembly and the shaft, and is usually of the order of about 1/32 to not more than about 3/32 inch in thickness.

The supplemental packing member of the assembly heretofore described are not absolutely essential inasmuch as these function almost solely during a start-up period of operation. Thus, if conditions permit a temporary leakage of liquid, the O-rings and seal members can be omitted, and sealing will be accomplished promptly after several reciprocations of the ram element.

Having described the invention and the best manner of its operation, what is claimed is:

In the processing of high solids sludges of malleable metal and accompanying non-metallic liquids, by the extrusion of the solids through a die in a boundary of a processing chamber by the action of a reciprocating element therein, said chamber having an aperture in a boundary opposite to said die, for movement of shaft means for actuating the reciprocating element, and said extrusion being accompanied by the formation of thin laminar shapes of the metal between said reciprocating element and the said chamber walls, a method of sealing the chamber and the actuating shaft means at said aperture by retracting said laminar shapes of the metal to an annular zone established between said actuating shaft means and said aperture, said zone including a portion of diminishing diameter, diminishing in a direction away from the said extrusion operation, and thereby forcing said laminar shapes to assume a shape gripping the actuating shaft means under the influence of the reciprocation thereof.

References Cited in the file of this patent

UNITED STATES PATENTS

| | | |
|---|---|---|
| 2,213,699 | Gillis et al. | Sept. 3, 1940 |
| 2,342,926 | De Zarate et al. | Feb. 29, 1944 |
| 2,485,526 | Bennett | Oct. 18, 1949 |
| 2,504,496 | Carter | Apr. 18, 1950 |
| 2,692,197 | Denison | Oct. 19, 1954 |
| 2,834,670 | Sienicki | May 13, 1958 |